United States Patent [19]
Kleinsasser

[11] Patent Number: 5,640,926
[45] Date of Patent: Jun. 24, 1997

[54] FEEDER FOR ANIMALS WITH HEIGHT ADJUSTMENT FOR CONTROLLING FEED DISCHARGE

[75] Inventor: Jonathan Kleinsasser, Manitoba, Canada

[73] Assignee: Crystal Spring Colony Farms Ltd., Manitoba, Canada

[21] Appl. No.: 379,306

[22] Filed: Jan. 27, 1995

[51] Int. Cl.⁶ .................................................. A01K 5/00
[52] U.S. Cl. .................................................. 119/53
[58] Field of Search ............................. 119/53, 53.5, 57, 119/54

[56] References Cited

U.S. PATENT DOCUMENTS

| | | | |
|---|---|---|---|
| 3,233,590 | 2/1966 | Venca | 119/53 |
| 4,147,132 | 4/1979 | Gilst | 119/53 |
| 4,444,151 | 4/1984 | Bohlmann | 119/53.3 |
| 4,660,508 | 4/1987 | Kleinsasser et al. | |
| 4,911,727 | 3/1990 | King | 119/53 |
| 5,010,849 | 4/1991 | Kleinsasser | 119/53 |

FOREIGN PATENT DOCUMENTS

| | | |
|---|---|---|
| 0464343 | 1/1992 | European Pat. Off. |
| 9209328 | 9/1992 | Germany |
| 8908388 | 9/1989 | WIPO |

*Primary Examiner*—Todd E. Manahan
*Attorney, Agent, or Firm*—Adrian D. Battison; Murray E. Thrift

[57] ABSTRACT

An adjustable feeder includes a first arrangement which acts as a dry feeder and provides two vertical slides (31) each on a respective side of a hopper (22) which is simultaneously vertically adjustable by straps (41) at the ends of the hopper. In a second arrangement the same adjustment system is used with a shelf type feeder so that the shelf (60) can be adjusted between a lower position for small animals and a raised position for large animals and the slides (31) can move vertically to accommodate the change in height of the shelf (60) and to adjust the distance of the slides (31) from the shelf (60) to control the feed flow.

19 Claims, 5 Drawing Sheets

FEEDER FOR ANIMALS WITH HEIGHT ADJUSTMENT FOR CONTROLLING FEED DISCHARGE

BACKGROUND OF THE INVENTION

This invention relates to a feeder for animals, of the type for feeding dry feed in particulate form, which includes a substantially horizontal surface beneath a hopper so that the feed from the hopper is discharged onto the surface and the amount of feed discharged is controlled by adjustment of the height of a lowermost edge of the hopper relative to the surface.

An example of a feeder of this type is shown in U.S. Pat. No. 4,660,508 of the present inventor and this type of feeder has become very successful and is widely known as a wet/dry feeder in view of the fact that the animal can take dry feed from the shelf of the feeder or can apply water into feed discharged into the trough to take the feed in the trough in wet condition.

it is also known to supply feed wholly in dry form in what is known as a dry feeder. The arrangement for discharging the feed from the hopper is somewhat similar in that there is provided a lowermost edge of the hopper which is positioned relative to the base of the hopper at a distance which can be adjusted so as to control the amount of feed which falls from the hopper onto the horizontal surface defined by the base or defined by a raised portion of the base.

Feeders of this type can either be double sided that is the feeder has two sides each of which can be accessed by a different set of animals so that generally the feeder is placed in a fence line to supply feed to animals in two separate panic. Other type of feeders are however single sided so that they have generally a vertical rear wall with the trough presented forwardly of that rear wall and the animals accessing the feeder only from the trough side of the rear wall.

SUMMARY OF THE INVENTION

It is one object of the present invention, to provide an improved arrangement, in a double sided feeder, for adjusting the distance of the lowermost edge of the hopper from the surface onto which the feed is deposited, It is a further object of the present invention, to provide an improved feeder of the type including a raised shelf which can be used to accommodate animals over a longer growth period, thus accommodating the animals when they are relatively small and also when they are of significantly increased size.

According to one aspect of the invention there is provided a feeder for animals comprising a hopper for containing feed for dispensing to the animals, the hopper having two generally upright end walls and two side walls each extending along the length of the hopper from one end wall to the opposed end wall, the side and end walls defining therebetween an open bottom;

a trough located beneath the hopper and including two end walls each at a respective end of the hopper and two side walls each on a respective side of the hopper;

means defining a generally horizontal surface located underneath the open bottom of the hopper and arranged for the feed to fall onto the surface from the open bottom of the hopper, the side walls of the trough each being arranged for a plurality of animals to reach over the respective side wall to the surface for accessing feed on the surface;

each side wall of the hopper including a substantially vertical lower portion adjacent the surface and a vertically movable adjustment portion having a lowermost edge defining a lowermost edge of the hopper for adjusting, by varying a height of the adjustment portion relative to the lower portion, a distance of the lowermost edge of the adjustment portion relative to the surface;

and means for simultaneously adjusting the height of the two adjustment portions comprising two elongate lift members each arranged adjacent a respective one of the end walls, means for vertically adjusting the height of each of the lift members relative to the respective end wall, two substantially horizontal support members each connected to a bottom end of a respective one of the lift members and each being coupled at respective ends thereof to respective ones of the adjustment portions such that vertical movement of the lift member causes simultaneous vertical movement of the adjustment portions adjacent the respective end wall of the hopper.

According to a second aspect of the invention there is provided a feeder for animals comprising: a trough having a base and a side wall over which the animals can reach for taking feed from the trough;

a shelf mounted above the base of the trough and arranged at a height such that the animal can take feed from the shelf while reaching over the side wall and such that feed falling from the shelf is collected in the trough;

a feed hopper positioned above the shelf for depositing feed onto the shelf, the hopper having a lowermost edge arranged at a distance from the shelf for controlling an amount of feed discharged from the hopper onto the shelf and for maintaining the feed discharged on the shelf unless moved from the shelf by the animal;

first adjustment means for raising and lowering the shelf between upper and lower extreme positions of the shelf;

and second adjustment means for raising and lowering the lowermost edge of the hopper between upper and lower extreme positions of the lowermost edge;

whereby the height of the shelf from the base of the trough can be adjusted to accommodate different sizes of animal and for each of those different sizes of animal said distance can be adjusted.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
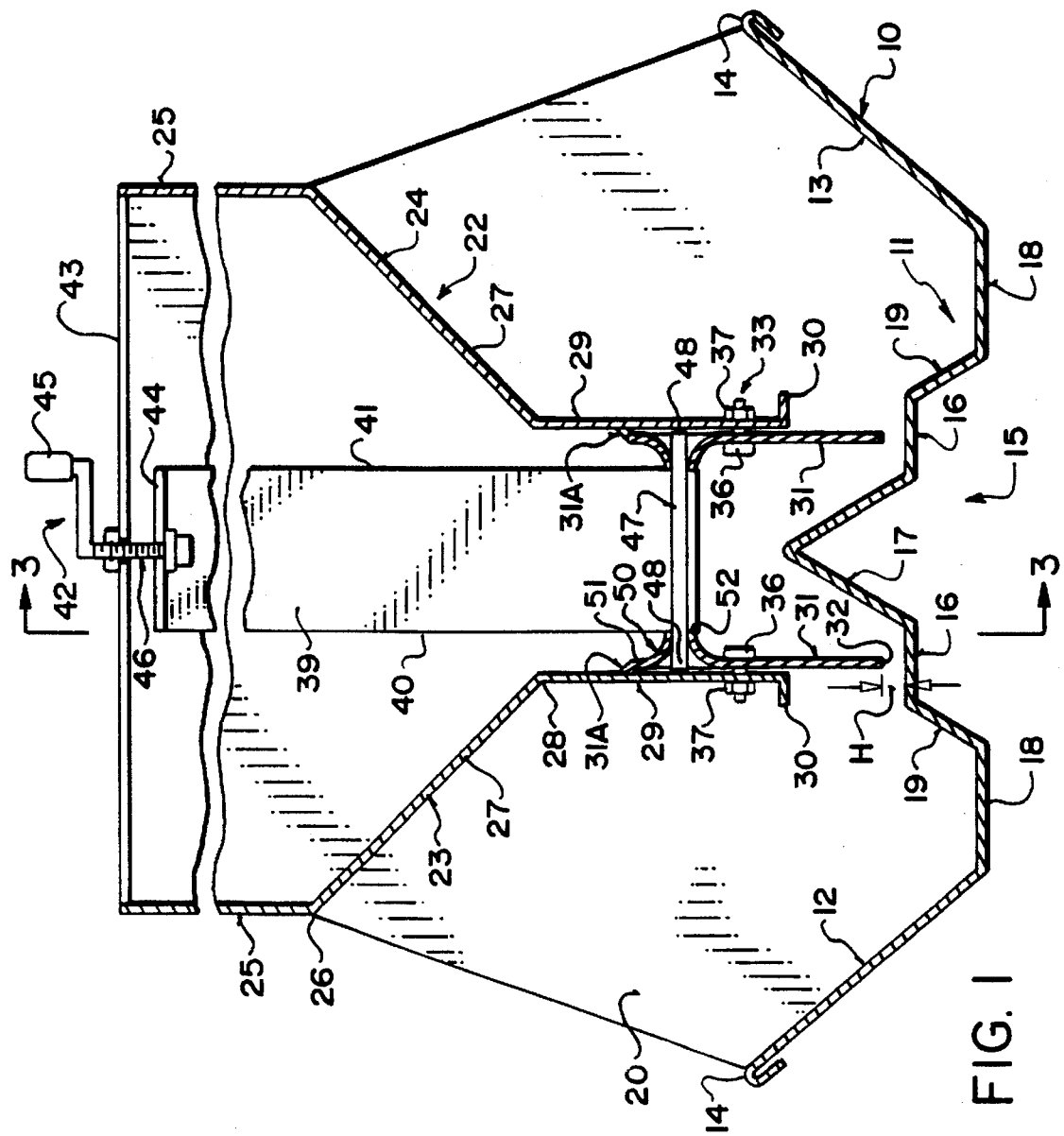
FIG. 1 is a transverse vertical cross section through a first embodiment of feeder according to the present invention.
Figure 2:
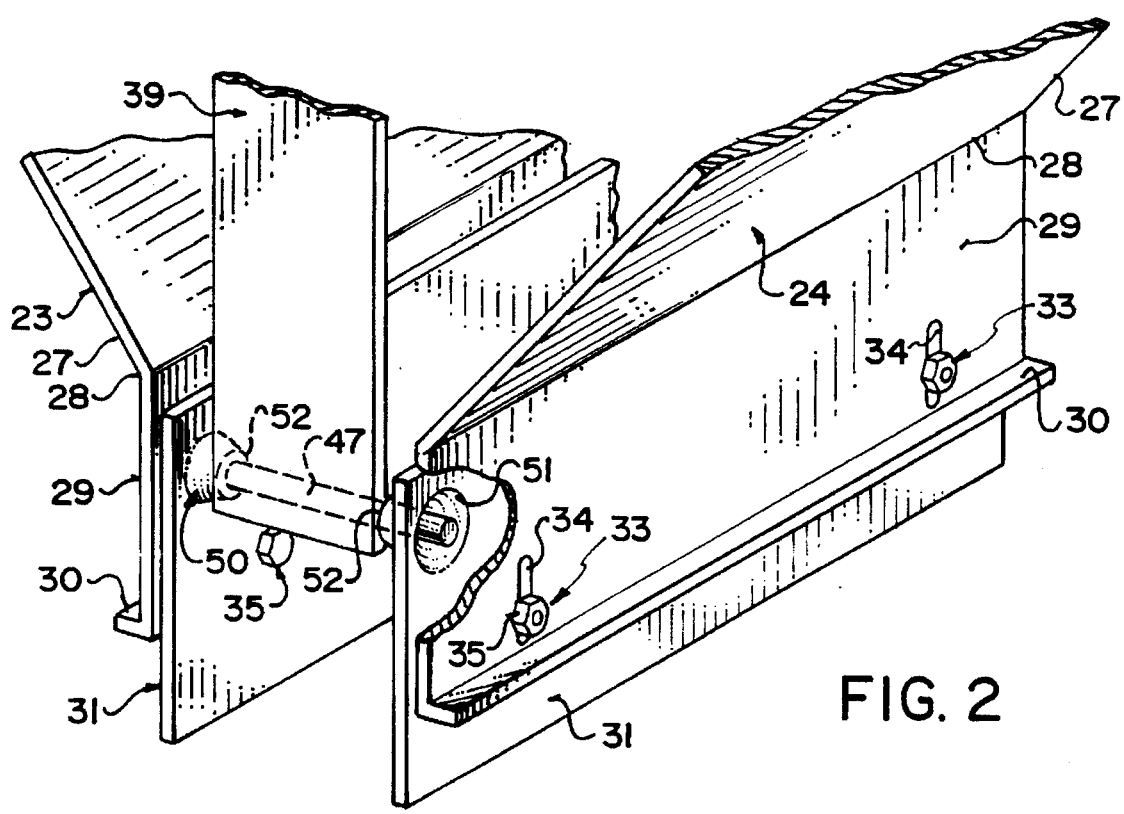
FIG. 2 is an isometric view showing the hopper of FIG. 1 with the trough and end wall removed for convenience of illustration.
Figure 3:
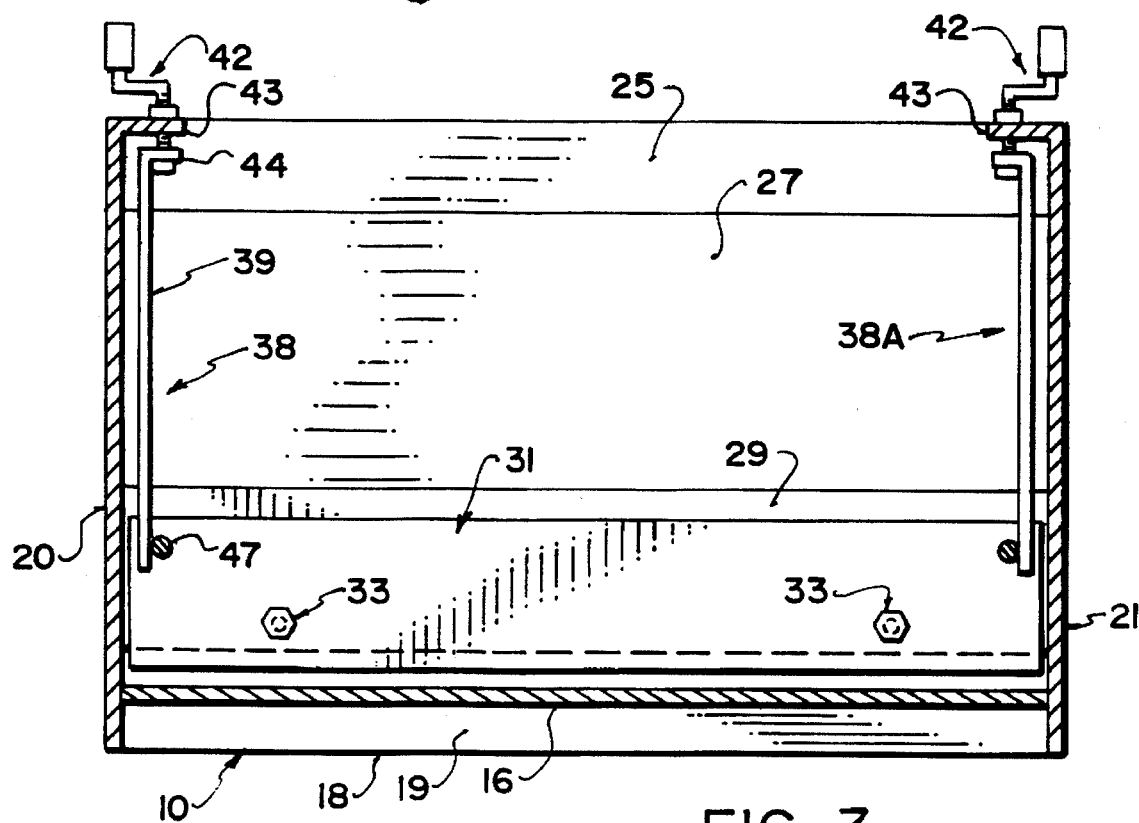
FIG. 3 is a cross sectional view along the lines 3—3 of FIG. 1 on a reduced scale for convenience of illustration.

Turning firstly to the embodiment in FIGS. 1, 2 and 3, the feeder comprises a trough 10 formed by a generally channel shaped member preferably formed from shoot metal bent to form a base 11 and two side walls 12 and 13 each arranged along a respective side of the base. The base is arranged to sit on a support floor with the side walls generally upstanding from the floor to an uppermost edge 14 of the side walls at which the side wall is folded back to avoid a raw edge adjacent the animal to feed from the trough. The base 11 includes a raised centre section 15 with two horizontal surface portions 16 and a raised central rib 17 above the horizontal surfaces 16. It will be appreciated therefore that the trough is double sided so that animals can reach over the side wall 12 to access feed at the base and also separately over the side wall 13 to access feed at the base. The trough is thus substantially symmetrical with the rib 17 along the centre of the trough. The horizontal surfaces 16 are raised from a lowermost base portion 18 by an upstanding portion 19. The raised centre section thus holds the feed discharged into the trough on the raised surfaces 16 so as to prevent any moisture present in or remaining in the base at the lowermost surface 18 from reaching the feed as it is discharged into the trough which could cause plugging of the feed at the discharge area. The raised central ribs 17 spreads the feed at the discharge position to one or other of the surfaces 16.

The ends of the trough are closed by end walls 20 which define gable ends and not only define ends of the trough but also define ends of the hopper 22. The end walls 20 and 21 are thus vertical and spaced by the length of the trough. As shown, the gable end walls can follow the shape of the trough or simply can be substantially rectangular so as to extend downwardly outside of the trough.

Above the trough is provided the hopper 22 which carries feed material to be discharged into the trough. The hopper thus includes a first side wall 23 and a second side wall 24 again symmetrical about a centre plane of the feeder. The side walls 23 and 24 each include a vertical upper section 25 defining the majority of the hopper and spaced by a width approximately equal to the width of the trough to accommodate a substantial quantity of feed. At the bottom edge 26 of the portion 25, the side walls 23 and 24 are inclined inwardly in a portion 27 which reduces the width of the hopper from the wider section at the upper part of the hopper down to a width slightly less than the width of the raised section 15 of the base. At the bottom edge 28 of each of the inclined portion 27 is defined a vertical lower portion 29 which extends vertically downwardly from the edge 28 to a lower lip 30 spaced upwardly from a respective one of the surfaces 16. The lip 30 at the bottom edge of the lower portion of the side wall is turned outwardly to provide strength at the bottom edge and to prevent bowing of the bottom edge to maintain the lower portion 29 in planar vertical shape.

Each of the side walls further includes an adjustment portion 31 in the form of a vertical plate along the furl length of the side wall and positioned inside the respective lower portion 29 for sliding movement upwardly and downwardly within the lower portion 29. Each of the adjustment portions 31 thus defines a lower most edge 32 the height of which relative to the respective surface 16 can be adjusted so as to adjust the distance or space between the lower most edge on the surface 16 which controls the amount of feed discharged from the hopper to the surface 16. This distance requires to be adjusted since the distance required to deposit a predetermined amount of feed onto the surface 16 varies for different types of feed and in particular in dependence upon the repose angle of the feed material. The intention is, however, that the distance be adjusted relative to the repose angle of the feed so that the feed remains on the surface 16 without passing over the surface 19 into the base portion 18 of the trough thus maintaining supply of feed at the surface 16 without allowing to much of the feed to discharge into the trough for wastage, The adjustment portions 31 thus form two vertical parallel plates each of which is movable vertically in a sliding action against the inside surface of the respective lower portion 29. In order to maintain the plate without bowing and to provide a tight edge of the plate against the inside of the lower portions, a top edge of the plate is bent outwardly at a few degrees into contact with the inside surface, as Indicated at 31A.

The adjustment portions 31 are held in sliding action against the respective lower portion 29 by a plurality of guide elements 33 arranged at spaced positions along the length of the hopper. Each guide element 33 comprises a vertical slot 34 defined in the lower portion. Through the slot and through a hole in the adjustment portion is provided a fastener 35 in the form of a bolt 36 and a nut 37. The nut is locked in place but is not clamped tight so that the adjustment portion is pinched between the nut and the edge 31A and so that there may be a slight play allowed between the outside surface of the adjustment portion and the inside surface of-the lower portion to allow a sliding action and very slight twisting or tilting movement of the adjustment portion if pushed inwardly by the animal. The adjustment portions are thus free to slide upwardly and downwardly to the extent defined by the slot 34.

Adjustment movement of the adjustment portions 31 is effected by an adjustment system including a first and a second adjustment members 38 and 38A arranged at respective ends of the hopper adjacent the gable end walls 20 and 21 respectively.

Each of the adjustment members comprises a lift member 39 in the form of a strap of sheet metal having side edges 40 and 41 with both side edges being vertical and parallel. The strap itself lies parallel to the respective gable wall. The strap is moved vertically by a screw jack system 42 connected between an upper flange 43 of the gable and an upper flange 44 of the strap. The screw includes a manually actuable handle 45 and a threaded rod 46 which operates to jack one of the flanges 43 and 44 relative to the other of the flanges in vertically upward and downward movement.

At the lower end of the strap is welded a transverse rod 47 which is horizontal and parallel to the gable wall. The rod projects outwardly beyond each side edge 40, 41 of the strap to an extent such that ends 48 of the rod are positioned just inside the inside surface of the lower portions 29 of the side walls of the hopper. The rod can thus freely slide up and down inside the upper portions 29 when jacked upwardly and downwardly by the screw jack 42, The ends 48 of the rod 47 each project through a hole in a respective one of the adjustment portions 31. Each of the holes as best shown in FIGS 1 and 2 is flared inwardly. Thus the material of the plate defining the adjustment portion 31 is flared to form a cone shaped portion 50 having a wide end 51 in the plane of the plate forming the different portion 31 and converging downwardly to an abutment end 52 inwardly of the plane of the plate. The abutment end 52 engages a respective one of the side edges 40 and 41 of the strap thus locating the plane of the plate slightly outwardly away from the strap and holding that plane closely adjacent the inside surface of the lower portion 29.

As an alternative arrangement the flared section 50 can be replaced by a bushing welded into the hole in the plate. The flare or bushing thus locates the vertical plane of the plate relative to the vertical side edge of the strap and prevents inward movement of the plate toward the strap.

It will be noted that the guides 33 are located at a height below the rod 47. While the guide 33 allows some twisting movement of the adjustment portion relative to the lower portion and also the cooperation between the flare 50 and the side edge of the strap also allows for some slight twisting movement, the cooperation between these elements limits the amount of twisting movement of the adjustment portion so that it is retained substantially in contact with the whole of the inside surface of the lower portion. This slight movement however particularly when the lower edge of the adjustment portion is pushed by the animal allows some movement of the lower most edge inwardly relative to the surface 16 to release feed material should it became blocked due to the poor flow characteristics of the feed material.

Figure 4:
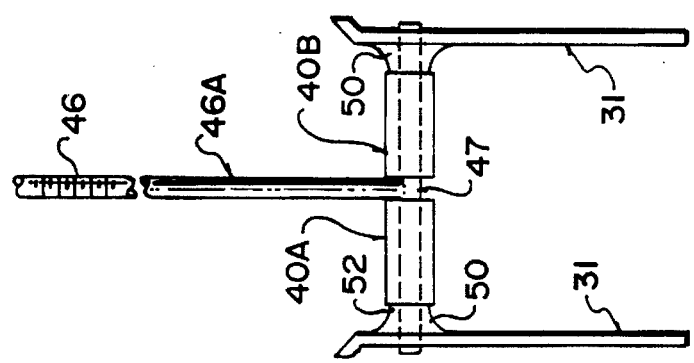
FIG. 4 is a cross sectional view similar to that of FIG. 1 showing the lift member and adjustment portions only of a modified embodiment.

In FIG. 4 is shown a modified arrangement in which the strap 39 is replaced by a rod 46A which is in effect an extension of the rod 46. The transverse rod 47 is welded to the lower end of the rod 46A. In view of the fact that there is now a significant space between the edge 52 of the flared portion 50 and the side edges of the rod 46A, a pair of spacer sleeves 40A and are engaged over the shaft 47 of either side of the rod 46A and the inside abutment edges 52 of the flared portions The arrangement defined above including the adjustment portions 31 and their sliding action relative to the lower portions 29 together with the two separate adjustment members 38 provides an effective adjustment system which is very simple to manufacture and in addition provides a convenient adjustment system by simple cranking of the screw jacks 42 which are readily available to the user. If it necessary therefore to adjust the distance H to accommodate changes in feed material, this can simply be effected rapidly and conveniently by actuating the screw jacks 42.

The arrangement is shown in the dry feeder of FIG. 1 in which the surface 16 is provided adjacent the base of the trough. The same arrangement can be used in a feeder in which the surfaces 16 are provided as a raised height and such a feeder may also supply water into the trough to provide a wet/dry feeder action.

Figure 5:
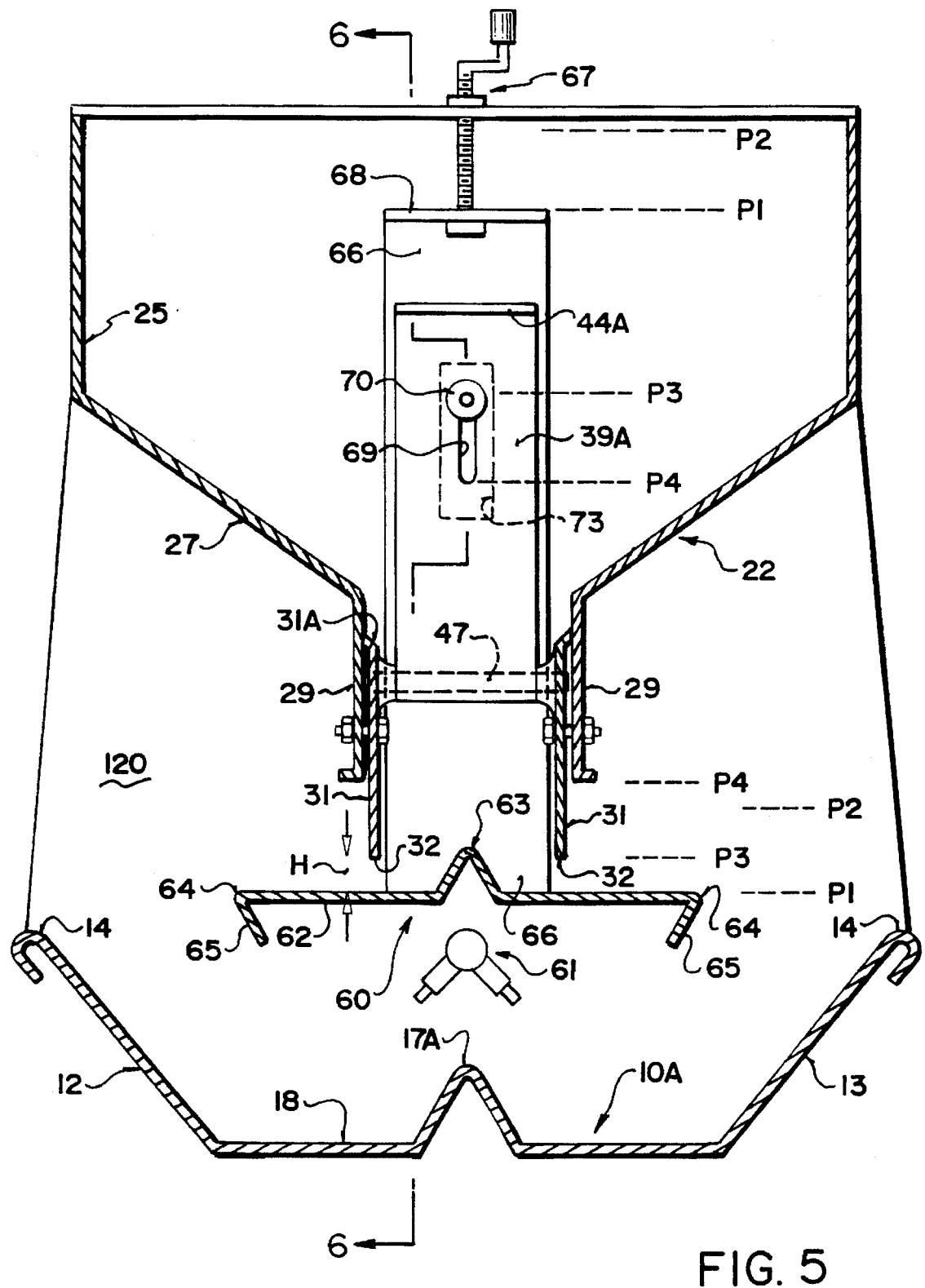
FIG. 5 is a vertical transverse cross sectional view of a second embodiment of feeder according to the present invention.
Figure 6:
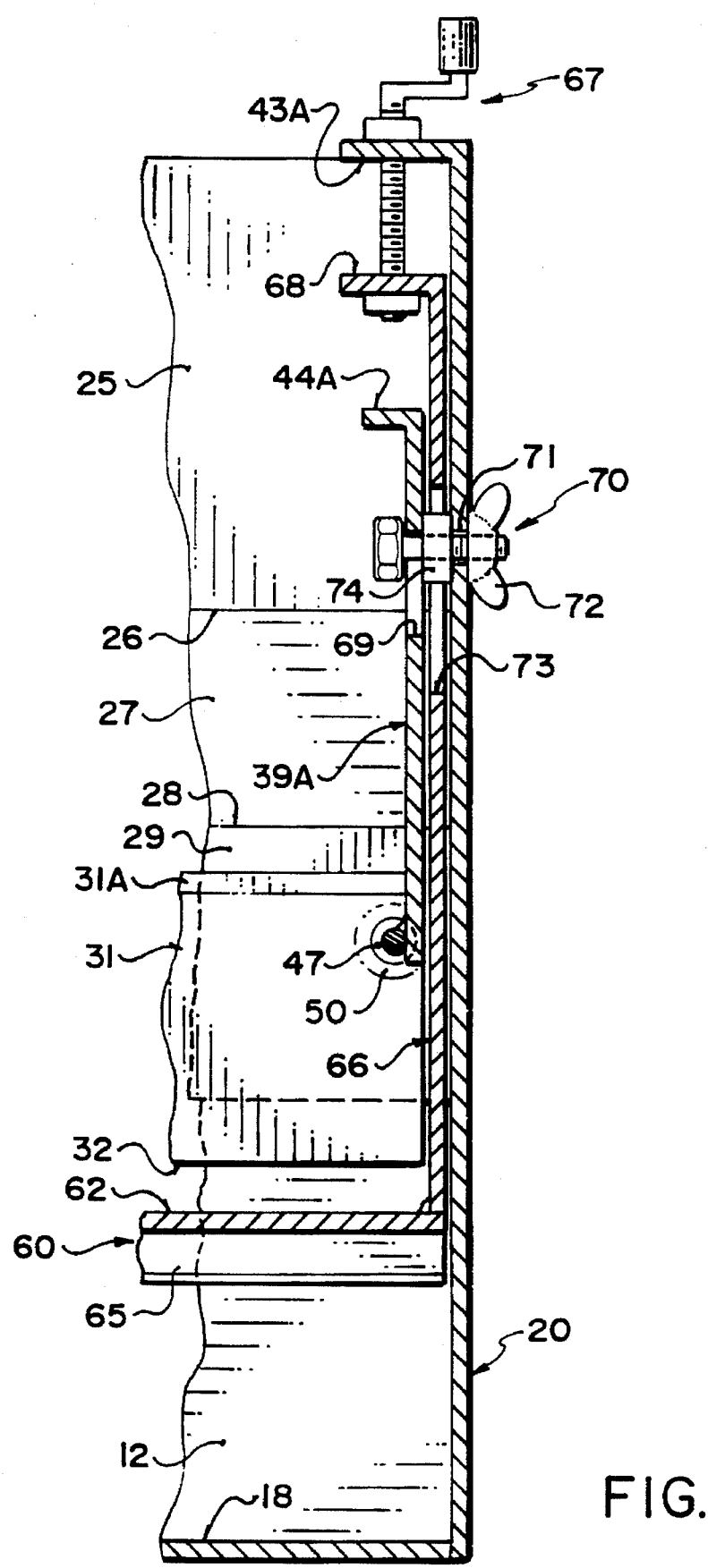
FIG. 6 is a cross sectional view along the line 6—6 of FIG. 5.
Figure 7:
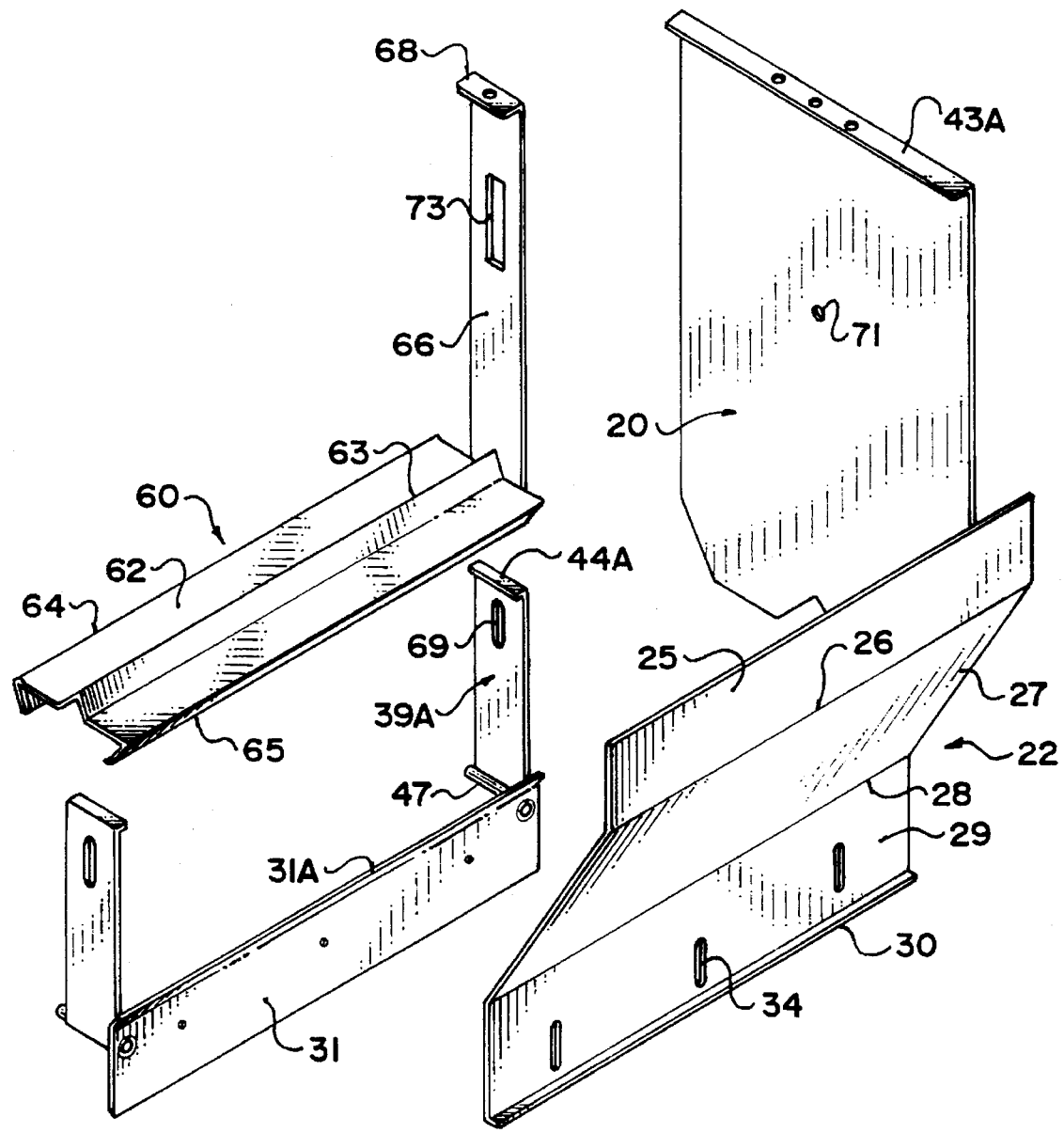
FIG. 7 is an exploded view of the parts of the embodiment of FIG. 5 with the trough and one end wall omitted for convenience of illustration.

Turning now to the embodiment in FIGS. 5 6 and 7, this provides a feeder which is very similar to that of FIG. 1 in that it includes a hopper 22 as previously described and a trough 10A very similar to that of the previous embodiment. The hopper 22 includes the lower portions 29 and the adjustment portions 31 which are mounted and arranged substantially as previously described. The feeder includes the end walls 20 and 21 and the hopper includes the vertical upper walls 25 and the inclined wall 27.

The trough is however modified in that the raised section 15 is omitted and in its place the feeder includes a separate shelf 60 which is spaced upwardly from the base 18 of the trough. The base 18 includes a central rib 17A which acts to divide the trough into two separate sections. An optional water supply system is also shown at 61 which can be used if required so that the feeder is of the wet/dry type or alternatively the water supply can be omitted so that the feeder is wholly of the dry type.

The shelf 60 provides a substantially horizontal surface 62 which is divided into two separate sections by a central raised rib 63 again for dividing the feed on either side of the shelf. The shelf includes two side edges 64 which are spaced outwardly of the lowermost edges 32 of the adjustment portions 31 so as to define a portion of the shelf onto which the feed can fall. The size of the shelf is arranged so that the feed remains basically on the shelf while access by the animal unless the animal moves the feed from the shelf into the trough. At the edges 64, the shelf includes a downturned flange 65 which avoids the raw edge of the shelf being presented to the animal. The shelf is arranged at a height above the front edge 14 of the side wall of the trough so that the animal can reach over the side wall underneath the shelf to the base 18 for accessing feed into that area or can reach over the side wall to the shelf for accessing feed on the shelf.

In order to maintain the feed properly on the shelf to the required amount without the feed discharging from the hopper over the edge 64 of the shelf, it is of course necessary to adjust the height of the lower most edge 32 of the hopper relative to the shelf, the height being indicated at and for this purpose the adjustment portions 31 are provided and are movable by the rod 47 and a strap 39A substantially as previously described.

The shelf 60 is carried at each end on a support strap 66 which is welded to the end of the shelf and stands upwardly therefrom. The strap 66 is arranged immediately adjacent the inside surface of the gable wall 20 and can ba moved upwardly and downwardly by a screw jack 67. The screw jack cooperates between an upper flange 68 of the strap 66 and an upper flange 43A of the gable wall 20. The shelf is adjustable thus by the screw providing a fine adjustment between two extreme positions. These extreme positions are indicated at P1, which is the position shown in FIG. 5 and a second raised position indicated at P2. These positions correspond to movement of the flange 68 from the position shown at P1 to the position shown at P2.

The strap 39A which adjusts the height of the adjustment portions 31 is modified relative to the strap 39 of the first embodiment. The modification is that the flange 44A at the top of the strap is not connected to a screw jack but is instead adjustable manually by simply grasping of the flange and pulling or pushing on the flange to move the flange. In the position shown in FIG. 5, the flange 44A and thus the lower most edge 32 is at its lowest position indicated at P3. The flange can be moved vertically upwardly by manual pulling on the flange and the amount of movement is controlled by the ends of a slot 69 provided in the strap 39A. The slot 69 cooperates with a fastener 70 which passes through a hole 71 in the gable wall 20 and cooperates with a wing nut 72 which acts to clamp the strap 39A in fixed position. In order to provide a clamping action without clamping against the strap 66, the strap 66 has an enlarged opening 73 and a washer 74 is provided on the fastener 70 which is of greater thickness than the thickness of the strap 66. In this way the clamping action of the strap 39A occurs by the fastener 70 against the surface of the washer 74 and the strap 66 is free to slide upwardly and downwardly to provide the adjustment between the positions P1 and P2. The ends of the slot 69 thus provide the extreme positions P3 and P4 of the adjustment of the lower most edge 32. The adjustment of the lower most edge 32 is therefore a relatively crude adjustment between two extreme positions. It is also possible to provide additional set positions for example 3 or 4 set positions but in general this is not necessary and two extreme positions are provided to provide the extreme movements of the lower most edges 32.

In operation, therefore, the feeder is set up initially for use by smaller animals so that the lowermost edges 32 are moved to the lower extreme position P3. In order to move to this position, of course, the shelf must firstly be moved to or close to its lower position P1. When the lower most edge is at its lowest position P3, and the shelf is at its lowest end position P1, the height H is at a maximum and generally larger than the required spacing for proper control of the feed material. The height H is thus adjusted in fine control by actuation of the screw jack 67 which pulls up the shelf to the required position to provide the required distance H. This distance H can then of course be adjusted if the feed is changed to provide the required control of the feed as it is discharged onto the shelf.

As the animals become larger, the feeder can be convened from the initial position to a raised position in which the feeder is more suitable for the larger animals. In order to achieve this, the strap 39A is adjusted vertically upwardly from the position to the position P4 thus raising the lower most edge 32 to the raised position. This movement of course increase the distance H to a distance significantly greater than that required for proper control of the feed. The shelf is then adjusted by actuating the screw jack 67 to raise the strap 66 thus pulling the shelf upwardly until the height H is moved to the required distance to control the feed.

In both positions of the shelf, the shelf is raised above the top edges 14 of the side walls of the trough so that the animal can feed from the shelf and from the trough in the conventional wet/dry action.

The distance between the extreme positions P3 and P4 is preferably of the order of 3 inches and certainly greater than 2 inches since this provides the required conversion between a feeder suitable for smaller animals and a feeder suitable for larger animals particularly when applied to pigs. Smaller pigs of the order of 15 lb. require the lower height of the shelf and pigs when they reach a size of the order of 110 lb. require higher shelf. The movement between the two of course occurs when the animals reach a suitable stage somewhere between these two weights, The arrangement of adjustable shelf can be used with a single sided feeder if required.

The course adjustment is as shown provided on the strap 39A and the fine adjustment is provided on the strap 66. It is of course possible to reverse this arrangement so that the course adjustment is effected on the shelf and the fine adjustment is effected on the lowermost edges 32.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A feeder for animals comprising a hopper for containing feed for dispensing to the animals, the hopper having two generally upright end walls and two side walls each extending along the length of the hopper from one end wall to the opposed end wall, the side and end walls defining therebetween an open bottom;

a trough located beneath the hopper and including two end walls each at a respective end of the hopper, a base and two side walls each on a respective side of the hopper;

means defining a surface located underneath the open bottom of the hopper and arranged for the feed to fall onto the surface from the open bottom of the hopper, the side walls of the trough each being arranged for a plurality of animals to reach over the respective side wall for accessing feed falling from the hopper onto the surface;

each side wall of the hopper including a substantially vertical lower portion adjacent the surface and a vertically movable adjustment portion having a lowermost edge defining a lowermost edge of the hopper for adjusting, by varying a height of the adjustment portion relative to the lower portion, a distance of the lowermost edge of the adjustment portion relative to the surface;

and means for simultaneously adjusting the height of the two adjustment portions comprising two elongate lift members each arranged adjacent a respective one of the end walls of the hopper, means for vertically adjusting the height of each of the lift members, two support members each connected to a bottom end of a respective one of the lift members and each being coupled at respective ends thereof to respective ones of the adjustment portions such that vertical movement of the lift member causes simultaneous vertical movement of the adjustment portions adjacent the respective end wall of the hopper;

each support member including a pin portion having a horizontal axis at a right angle to the respective adjustment portion;

and each adjustment portion including an opening into which the pin portion extends so as to allow limited movement between the adjustment portion and the pin portion.

2. The feeder according to claim wherein each of the adjustment portions is vertically slidable against an inside surface of the respective lower portion and wherein there is provided guide means on the respective lower portion for guiding the vertical movement of the respective adjustment portion and maintaining the adjustment portion substantially in sliding contact with the lower portion.

3. The feeder according to claim 2 wherein the guide means comprises a plurality of horizontally spaced vertical slots provided in at least one of the lower portion and the adjustment portion and fastening means extending through the slots.

4. The feeder according to claim 1 wherein each of the support members includes locating means thereon for locating the adjustment portions at spaced positions along the length of the respective pin portion of the support member.

5. The feeder according to claim 4 wherein each pin portion comprises a respective end portion of a single horizontal rod.

6. The feeder according to claim 5 wherein each of the adjustment portions comprises a plate of sheet metal which has a flared hole therein defining the opening for engaging over the end portion of the rod, the flared hole defining a flared portion of the plate which is diverted out of a plane of the plate and defining an end surface of the flared portion, the rod having means thereon for engaging the end surface of the flared portion to locate the position of the adjustment portion on the rod.

7. The feeder according to claim 6 wherein the lift member comprises a strap with edges of the strap spaced along the length of the rod and the edges of the strap engaging the end surfaces of the flared portions to locate the adjustment portions relative to the rod.

8. The feeder according to claim 6 wherein the lift member comprises a narrow element spaced inwardly along the rod from the flared portions and wherein the rod carries a pair of collar members extending between side edges of the lift member and the end surfaces of the respective flared portion for locating the adjustment portion on the rod.

9. The feeder according to claim 1 wherein the surface comprises a raised section of the base of the trough arranged along the trough between the side walls of the trough and below top edges of the side walls of the trough.

10. The feeder according to claim 1 wherein the surface is defined by a shelf formed separately from the base of the trough and raised above the base of the trough to a height above upper edges of the side walls of the trough and wherein there is provided means for adjusting the height of the shelf relative to the base of the trough.

11. A feeder for animals comprising a hopper for containing feed for dispensing to the animals, the hopper having two generally upright end walls and two side walls each extending along the length of the hopper from one end wall to the opposed end wall, the side and end walls defining therebetween an open bottom;

a trough located beneath the hopper and including two end walls each at a respective end of the hopper, a base and two side walls each on a respective side of the hopper;

means defining a surface located underneath the open bottom of the hopper and arranged for the feed to fall onto the surface from the open bottom of the hopper, the side walls of the trough each being arranged for a plurality of animals to reach over the respective side wall for accessing feed falling from the hopper onto the surface;

each side wall of the hopper including a substantially vertical lower portion adjacent the surface and a vertically movable adjustment portion having a lowermost edge defining a lowermost edge of the hopper for adjusting, by varying a height of the adjustment portion relative to the lower portion, a distance of the lowermost edge of the adjustment portion relative to the surface, each of the adjustment portions being vertically slidable against an inside surface of the respective lower portion;

and means for simultaneously adjusting the height of the two adjustment portions comprising two elongate lift members each arranged adjacent a respective one of the end walls of the hopper, means for vertically adjusting the height of each of the lift members, two support members each connected to a bottom end of a respective one of the lift members and each being coupled at respective ends thereof to respective ones of the adjustment portions such that vertical movement of the lift member causes simultaneous vertical movement of the adjustment portions adjacent the respective end wall of the hopper;

each adjustment portion including means connecting the adjustment portion to the respective end of the support member and arranged so as to allow limited movement between the adjustment portion and the end of the support member;

and guide means on the respective lower portion for guiding the vertical movement of the respective adjustment portion and maintaining the adjustment portion substantially in sliding contact with the inside surface of the lower portion, said guide means comprising a plurality of horizontally spaced vertical slots provided in at least one of the lower portion and the adjustment portion and fastening means extending through the slots, the fastening means being loose to allow limited movement of the adjustment portion relative to the lower portion.

12. The feeder according to claim 11 wherein the fastening means is spaced vertically from the connecting means of the support member so that the fastening means and the connecting means act to limit the movement of the adjustment portion relative to the lower portion.

13. The feeder according to claim 11 wherein the surface is defined by a shelf formed separately from the base of the trough and raised above the base of the trough to a height above upper edges of the side walls of the trough and wherein there is provided means for adjusting the height of the shelf relative to the base of the trough.

14. The feeder according the claim 11 wherein each support member includes a pin portion having a horizontal axis at a right angle to the respective adjustment portion and each adjustment portion includes an opening into which the pin portion extends.

15. A feeder for animals comprising a hopper for containing feed for dispensing to the animals, the hopper having two generally upright end walls and two side walls each extending along the length of the hopper from one end wall to the opposed end wall, the side and end walls defining therebetween an open bottom;

a trough located beneath the hopper and including two end walls each at a respective end of the hopper and two side walls each on a respective side of the hopper;

means defining a surface located underneath the open bottom of the hopper and arranged for the feed to fall onto the surface from the open bottom of the hopper, the side walls of the trough each being arranged for a plurality of animals to reach over the respective side wall for accessing feed falling from the hopper onto the surface;

each side wall of the hopper including an outwardly diverging upper portion and a substantially vertical lower portion connected to the upper portion at an uppermost edge of the lower portion;

the lower portion being arranged adjacent the surface and including a vertically movable adjustment portion having a lowermost edge defining a lowermost edge of the hopper for adjusting, by varying a height of the adjustment portion relative to the lower portion, a distance of the lowermost edge of the adjustment portion relative to the surface, each of the adjustment portions being vertically slidable against an inside surface of the respective lower portion;

and means for simultaneously adjusting the height of the two adjustment portions comprising two elongate lift members each arranged adjacent a respective one of the end walls of the hopper, means for vertically adjusting the height of each of the lift members, two support members each connected to a bottom end of a respective one of the lift members and each being coupled at respective ends thereof to respective ones of the adjustment portions such that vertical movement of the lift member causes simultaneous vertical movement of the adjustment portions adjacent the respective end wall of the hopper;

each adjustment portion including an uppermost edge which is below the uppermost edge of the lower portion so as to be spaced downwardly from the upper portion of the hopper side wall, said uppermost edge of the adjustment portion being inclined relative to a main body of the adjustment portion outwardly into engagement with the inside surface of the lower portion.

16. The feeder according to claim 15 wherein each adjustment portion includes means connecting the adjustment portion to the respective end of the support member and arranged so as to allow limited movement between the adjustment portion and the end of the support member and wherein there is provided guide means on the respective lower portion for guiding the vertical movement of the respective adjustment portion and maintaining the adjustment portion substantially in sliding contact with the inside surface of the lower portion, said guide means comprising a plurality of horizontally spaced vertical slots provided in at least one of the lower portion and the adjustment portion and fastening means extending through the slots, the fastening means being loose to allow limited movement of the adjustment portion relative to the lower portion.

17. The feeder according to claim 15 wherein the fastening means is spaced vertically from the connecting means of the support member so that the fastening means and the connecting means act to limit the movement of the adjustment portion relative to the lower portion.

18. The feeder according to claim 15 wherein the surface is defined by a shelf formed separately from the base of the trough and raised above the base of the trough to a height above upper edges of the side walls of the trough and wherein there is provided means for adjusting the height of the shelf relative to the base of the trough.

19. The feeder according the claim 15 wherein each support member includes a pin portion having a horizontal axis at a right angle to the respective adjustment portion and each adjustment portion includes an opening into which the pin portion extends.

\* \* \* \* \*